Sept. 8, 1931.  C. W. SQUIRES  1,822,461
CIRCUIT CLOSER
Filed June 15, 1927   2 Sheets-Sheet 1
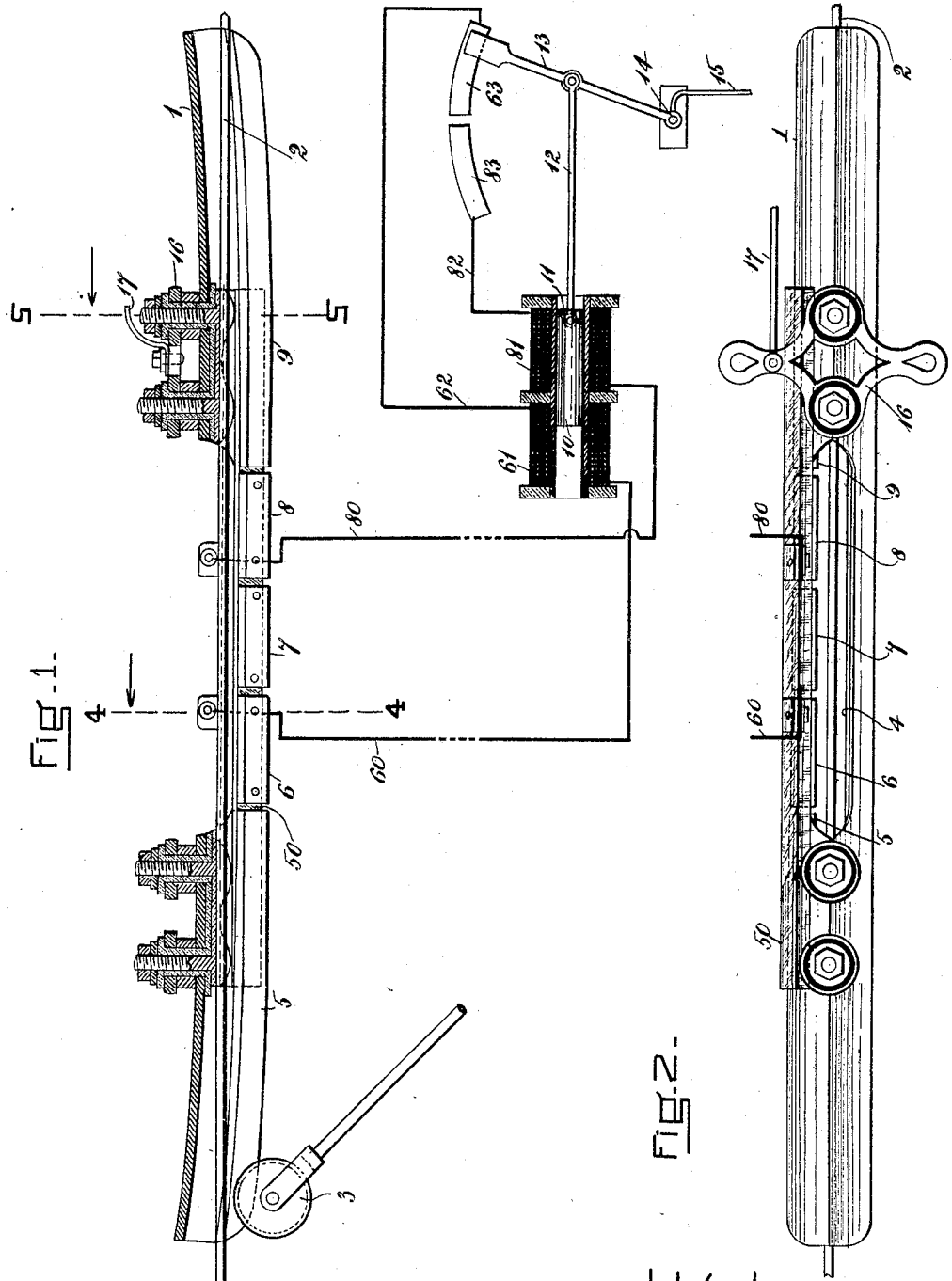
INVENTOR:
Charles W. Squires
BY
ATTORNEYS:

Sept. 8, 1931.  C. W. SQUIRES  1,822,461
CIRCUIT CLOSER
Filed June 15, 1927    2 Sheets-Sheet 2
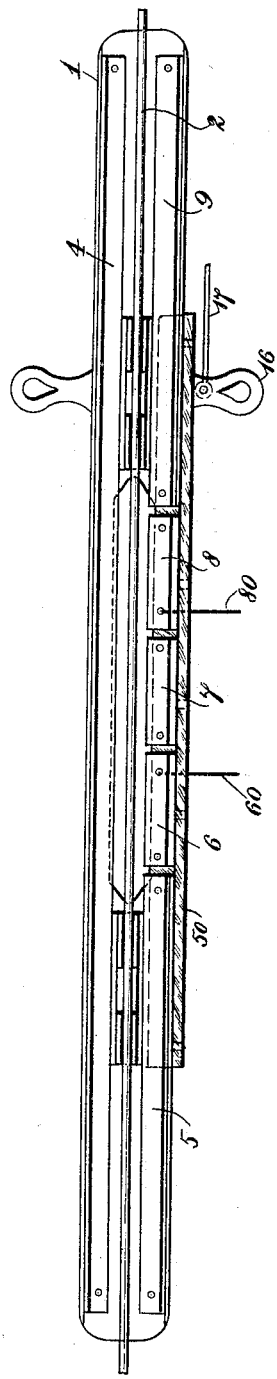
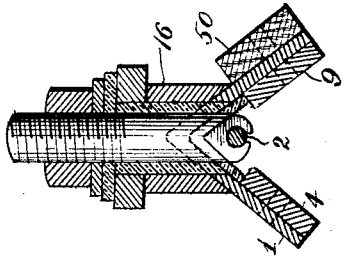
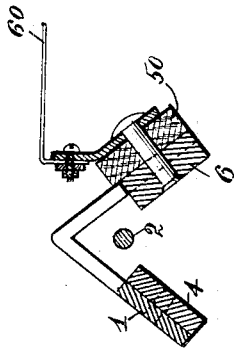
INVENTOR=
Charles W. Squires
By Coale H Mayer
ATTORNEYS=

Patented Sept. 8, 1931

1,822,461

UNITED STATES PATENT OFFICE

CHARLES W. SQUIRES, OF BEVERLY, MASSACHUSETTS

CIRCUIT CLOSER

Application filed June 15, 1927. Serial No. 199,098.

This invention relates to circuit closing mechanism for use in trolley systems in connection with electrically-operated rail switches.

In supplying current for operating such a switch, it is customary to utilize the trolley wheel in the overhead trolley to connect a branch circuit with the power line, that is, at certain predetermined points in the line a connection is made through the trolley wheel so that current flows in a branch circuit which energizes solenoids for operating the rail switch directly or for operating a relay switch which, in turn, controls the solenoid. While a single impulse of current in the branch circuit is sufficient, it may happen that the car stops in position to maintain the contact closed, so that instead of a momentary current, as would occur in the passage of the trolley wheel across the contact, a continuous current flows in the branch circuit. This involves not only an unnecessary waste of power but is likely to burn out the coils in which it is used. My invention contemplates a circuit closing mechanism arranged to operate automatically to cut off the flow of current in the branch circuit immediately after it has been set up and whether or not the trolley wheel leaves its contact with the power line. This I accomplish by providing in the branch circuit a solenoid-operated switch arranged to be moved to open position by the passage of a current through the branch circuit.

An important feature of my invention consists in the provision of a pair of contacts associated with the power line of the system and incorporated in the branch circuit to control solenoids for shifting the switch in opposite directions so as to open the circuit immediately in the branch through which current is flowing and establish contact in a branch not at the moment connected with the power line but arranged to be energized by further movement of the trolley wheel into engagement with the second of the power contacts. By this construction, a single impulse of current only is insured through the branch circuit in whichever direction the trolley wheel travels, and after each passage of the trolley wheel the system is arranged in condition to be operated again.

My invention is an improvement in the general type of mechanism shown in Letters Patent No. 1,220,701, shown in use for operating a track switch, and in Letters Patent No. 1,244,138, both of said patents being granted to me, though it may be otherwise used.

These and other features of the invention will be best understood and appreciated by the following description of a preferred embodiment thereof, selected for purposes of illustration and shown in the accompanying drawings, in which—

Fig. 1 is a longitudinal section of a so-called contactor with the circuits connected thereto adapted for use with a track switch mechanism such as is described in said Patent No. 1,244,138.

Fig. 2 is a top view of the contactor shown in Fig. 1.

Fig. 3 is an under view thereof.

Figs. 4 and 5 are sections on lines 4—4 and 5—5 of Fig. 1.

The contactor 1 is in all essential respects like those now in use. See for example that shown in Patent No. 1,199,831 and other track switches shown in patents granted to me. It is hung from the trolley wire 2 in the usual way so that while it is electrically connected with trolley wire the trolley wheel 3 contacts with it and not with the trolley wire. The contactor has at one edge of its under side a metal strip 4 and at the other edge a similar metal strip composed of sections 5, 6, 7, 8 and 9. Of these sections, 6, 7 and 8, are insulated from the contactor by a strip of insulating material 50, shown as wood. This is preferably riveted to the respective metal strip sections of the contactor. Thus these sections 6 and 8 are not energized unless the trolley wheel in passing engages one of them, connecting it electrically with the opposite metal strip 4. These sections 6 and 8 have connections 60 and 80 running from them as below described and are separated by a neutral section 7 so that the trolley wheel 3 can only come in contact with one of these sections at a time. The trolley wheel 3 in passing under the contactor will engage these strips with its edges but with only one strip, 6 or 8 at a time, and either of the circuits 60 or 80 which happens to be closed at the time will receive momentary energization.

Section 6 is connected by wire 60 with the coil 61, and section 8 by wire 80 with coil 81, these coils operating the core 10 and forming therewith a solenoid, the core 10 being connected by a guide piece 11 and link 12 to the switch 13 and operates it as the core 10 is caused by the current in the coil 61 or coil 81 to move in or out from the coils.

Each coil is also connected by a wire 62, 82, with a contact plate 63, 83, with which the switch member 13 may connect.

The switch 13 is pivoted at 14 and is connected by the wire 15 with any appropriate track switch mechanism, this wire 15 corresponding with the wire $j$ in my Patent No. 1,220,701.

It will be seen that the trolley which contacts with the section 6 energizes the circuit 60, 61, etc., the solenoid operates the switch 13 and almost immediately breaks the circuit comprising the wire 15, etc., so there is only a momentary connection possible in this wire and its connections (not shown) as in the wire $j$ in Patent No. 1,220,701. (See also Patent No. 1,244,138.)

The section 7 on the contactor is electrically separated from both 6 and 8, and is sufficiently long to prevent a trolley wheel from contacting simultaneously with sections 6 and 8 and so energizing both coils 61 and 81 at the same time.

16 is a clip of ordinary construction and 17 is a feed wire which may bring current to the contactor if desired.

Anyone skilled in the art will see that my invention may be otherwise embodied and may be otherwise utilized than as above described. It is shown, however, embodied in the simplest way now known to me and one which may be operated with but little attention, a peculiarity of it being that the circuit controlling mechanism is caused to be properly operated electrically by an initial impulse which cannot be prolonged because in causing it its circuit is immediately broken at the switch 13 which is thrown to close the other circuit, thus setting the mechanism for another impulse. By this means a continuous current in the wire 15 is impossible and the instrument with which it is connected cannot be burnt out.

The switch 13 and its mechanism may have a suitable housing and may be carried by the contactor or placed in a controller box or elsewhere if desired.

It must be understood that at no time is the current from the contactor expected to operate the track coil, nor will it do so.

The electric impulse thru the conductor 15 is used only as a means to effect the closing of the operating circuit of the controlling mechanism proper.

What I claim as my invention is:

In a trolley system, in combination, a contactor carrying a plurality of contacts adapted to be engaged by the trolley wheel, a switch mechanism and electrical connectors between said switch mechanism and said contactors, whereby when one of said contacts is energized said switch will be thrown to break the connection between the switch mechanism and said contact and to make connection between said mechanism and another of said contacts.

CHARLES W. SQUIRES.